United States Patent [19]

Skidmore

[11] 4,196,764

[45] * Apr. 8, 1980

[54] PNEUMATIC TIRE WITH REINFORCED BELT CONFIGURATION

[76] Inventor: Frank O. Skidmore, 2513 - 3rd St., Cuyahoga Falls, Ohio 44223

[ * ] Notice: The portion of the term of this patent subsequent to Aug. 9, 1994, has been disclaimed.

[21] Appl. No.: 834,246

[22] Filed: Sep. 19, 1977

[51] Int. Cl.² .............................................. B60C 9/18
[52] U.S. Cl. ........................... 152/361 R; 152/354 R; 152/358
[58] Field of Search .................... 152/354, 355, 357 R, 152/358, 361 R, 361 DM, 361 FP

[56] References Cited

U.S. PATENT DOCUMENTS

| | | | |
|---|---|---|---|
| 1,560,700 | 11/1925 | Langer | 152/358 |
| 2,749,959 | 6/1956 | Kunel | 152/357 R X |
| 3,598,165 | 8/1971 | Hanus | 152/361 R |
| 3,831,656 | 8/1974 | Senger et al. | 152/361 DM X |
| 3,919,018 | 11/1975 | Schroeder | 152/361 R X |
| 4,040,464 | 8/1977 | Skidmore | 152/361 R |
| 4,073,330 | 2/1978 | Allard | 152/361 DM |

FOREIGN PATENT DOCUMENTS 2458275  6/1976  Fed. Rep. of Germany ...... 152/361 R

Primary Examiner—Randolph A. Reese

Attorney, Agent, or Firm—Oldham, Oldham, Hudak & Weber

[57] ABSTRACT

The invention relates to the use of reinforcing cords associated with the pneumatic tire to control radial force variations in the tire under loaded conditions, and the method of applying such reinforcing cords woven in a warp and weft relationship cut in a bias shape to form a belt, such belt extending past the lateral edges of the present belt and applied to the tire either in its new form or as a retreaded tire from an old carcass. It can be extruded into the tread material as it is initially formed. Basically, the cords are made from a very high strength material, either synthetic, wire, or the like, having a tensile strength of approximately 125 psi each, with the cords spaced at approximate ¼ inch spacings. Hence, there will be four cords, more or less, per inch. The cords could be increased to 150 or more pounds each. There will be approximately 20 to 40, depending upon the width of the tread area of the tire involved and the width of the normal belt ply in the radial or bias ply tire involved. This type of construction serves as an extra belt of many hundred pounds tensile strength, thereby controlling radial force variations in the tire, maintaining the integrity of the belt plies already in the tire, and is particularly applicable to controlling these forces in retreaded tires and particularly retreaded radial tires by preventing delamination of the retread at the old belt ply area.

9 Claims, 4 Drawing Figures

PNEUMATIC TIRE WITH REINFORCED BELT CONFIGURATION

BACKGROUND OF THE INVENTION

Heretofore, it has been known to produce normal bias ply and radial tires with fabric or steel belts incorporated therein, which belts are designed to make the tread run flatter and give better road contact, and which belts also are alleged to increase the overall life-wearing characteristics of the tire.

However, these belts are always of bias, ply-type construction, and therefore do not completely control radial force variations in the tire, which force variations lead to a bumpy and uneven ride in the vehicle upon which the tire is mounted. Force variations have become an increasing problem in radial tires because of the much longer and heavier treads thereof, and further because these tires have a larger overall footprint configuration where the tire meets the road and, hence, tend to have more susceptibility to radial force variations. It is further believed more difficult to control the exact circular or circumferential nature of the radial tires, and it is this factor which I believe leads to increased difficulty with such force variations in radial tires.

It has further been a problem in retreaded bias or radial tires having the fabric or steel belts incorporated therein, that a delamination occurs at the lateral edges of the belts with respect to the retreaded portion, thereby making the retread ineffective and substantially cutting the life of the retread. Such delaminations also occur in radial tires, particularly at the lateral edges of the belts even in new tires, because of a weakened area occurring in the radial tire at these areas due to greater flexing, and the fact that the outer tread rubber cannot adhere through these lateral edges because of the greater flexing during the running of this tire.

It should be understood that the instant invention represents an improvement over the siping arrangement and belt procedure of my own prior U.S. Pat. No. 4,040,464 that issued on Aug. 9, 1977, wherein the siping material actually forms a reinforcing belt right at the base of the tread design which I have found does not give as good a reinforcing ability as when this belt is positioned between the bottom of the tread design and the belts in the tire, as shown in my FIGS. 1 through 3 herein. This is partially because the siping material is not vulcanized to rubber tread. In addition, the siping arrangement did not extend over the lateral edges of the belt plies and, hence, the delamination problem at that point was not solved.

OBJECTS OF THE INVENTION

Based on the above, it is the general object of my invention to achieve an improvement in radial force variation characteristics of pneumatic tires, particularly adaptable to radial tires, and as well as to eliminate or substantially reduce the delamination effect taking place at the edge of the belts in radial or bias ply tires by the provision of reinforcing cords woven together as in a fabric, being included in the final cure process as a bias cut belt of the construction of radial tires to maintain a great longitudinal tensile strength at the circumference of the tire, as well as at the lateral edges of the normal fabric or steel belts incorporated therein, thereby improving force variations and delamination characteristics.

It is further an object of my invention to provide this tensile strengthening cord arrangement in an economical and efficient fashion for new and recapped tires.

Is is a further object of my invention to incorporate in conjunction that the reinforcing cords is of an open weave, spaced to permit bonding of the new tread material to the buffed surface of the tire in a retreaded operation.

It is further an object of my invention that the strengthening cords may run circumferentially or bias, and still achieve the prevention of delamination at the edges of the belts.

A further object of the invention is to improve the out-of-round or unbalanced radial force conditon in tires and thereby give greater mileage in both gas savings and service.

The aforesaid and other objects of the invention which will become apparent in the description which follows are achieved by providing a pneumatic tire having a tread, a carcass, sidewalls, and a strip of scrim material positioned between the base of the tread and carcass over the full circumference thereof and across a substantial width of the tread, which is characterized by the scrim material including warp and weft cords which extend in substantially parallel relationship to each other to form a belt around the full circumference of the tire, said cords having great tensile strength and being subject to minimum elongation within their designed tensile strength, said cords acting to reduce radial force variations in the tire under operating conditions, said cords being joined at their intersections and vulcanized into bonded relation with the tread and carcass.

DESCRIPTION OF THE DRAWINGS

For a better understanding of the invention, reference should be made to the accompanying drawings, wherein.

DETAILED DESCRIPTION OF THE PREFERRED EMBODIMENTS

Figure 1:
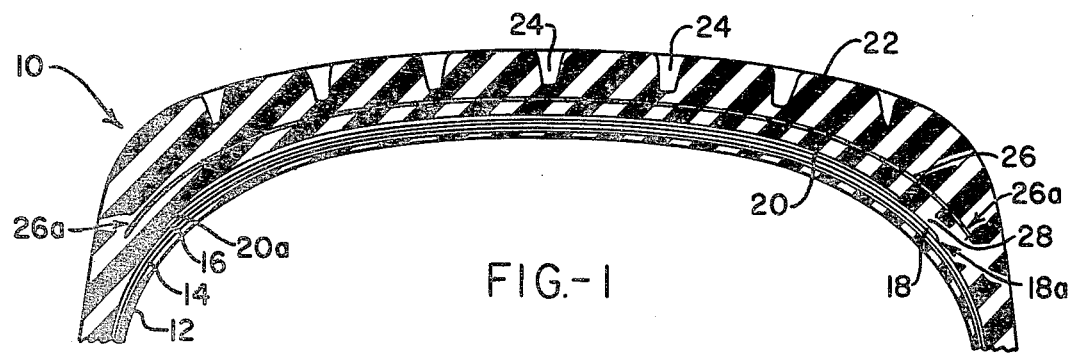
FIG. 1 is a cross-sectional illustration of a tire carcass having two belt plies with the improved strengthening cord arrangement of the instant invention positioned between the depth of the tread pattern and the belts.

Now, with reference to the embodiment shown in FIG. 1 of the drawings, the numeral 10 illustrates a tire carcass generally comprising a carcass section 12 having fabric or wire bias plies 14 and 16 making it up in the usual manner for either a bias ply tire or a radial tire. On top of the carcass are two belt plies, these being illustrated by numerals 18 and 20. Preferentially, these belt plies can be made from metal woven strands, or they can be of synthetic fibers, or the like, and the use of these belts is well understood and known by anyone skilled in the art.

The tire tread is illustrated by numeral 22, and into the tread goes a tread design 24 to give the tire proper traction and gripping on the road.

The essence of my invention is achieved by providing an extra belt illustrated generally by numeral 26 that is positioned substantially between the bottom depth of the tread design 24 and the upper belt 20. Preferably, my belt extends completely down and over the lateral edges 18a and 20a of the belts as illustrated in the general area by numeral 26a. I have found that quite frequently a delamination begins to occur in the tire carcass at about the area indicated by numeral 28 because of the overlapping or positional arrangement of the belts 18 and 20. I have found that the use of the added belt 26 extending down well past the lateral edges 18a and 20a will substantially eliminate the delamination at area 28, particularly when a recapping procedure is utilized. This improvement is very important to the life of the retread, as well as the new tire; when in radial tires, delamination has been a frequent problem.

I have also found that the positioning of the additional belt 26 between the belts 18 and 20 and the bottom of the tread design 24 adds a substantial degree of stability within the rubber tire tread 22 so as to eliminate squirm of the tread portion 24 on the road surface and thereby improves tire wear as well as gas mileage.

Figure 2:
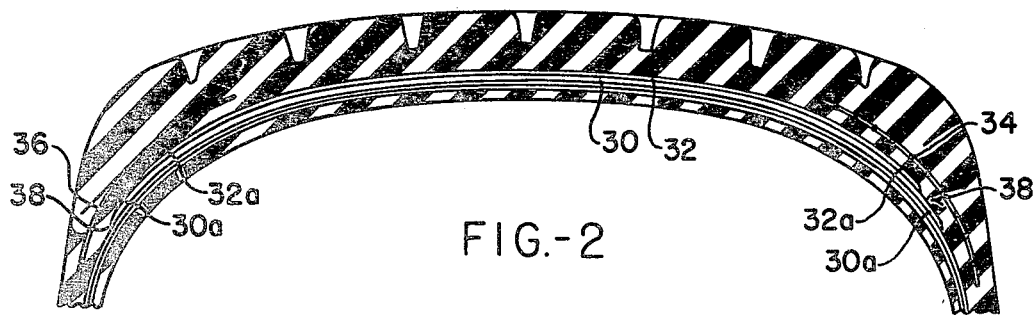
FIG. 2 is a carcass similar to that shown in FIG. 1 except having the strengthening cords positioned over only the lateral edges of the belts.

FIG. 2 illustrates a slightly modified embodiment of the invention wherein the numerals 30 and 32 illustrate the conventional belts, and numerals 34 and 36 illustrate added belts in accordance with the concept of the invention which extend fully over the lateral edges 30a and 32a of the belts as illustrated. The belts 34 and 36 are designed to cover substantial equal distances from the lateral edges 30a and 32a as illustrated so as to provide a uniformed extension over that area 38 which tends to delaminate. It has been found that this structure is particularly beneficial on a retreaded radial or bias ply tire and substantially eliminates any of the delamination occurring with the tire at the lateral edges of the belts.

Figure 3:
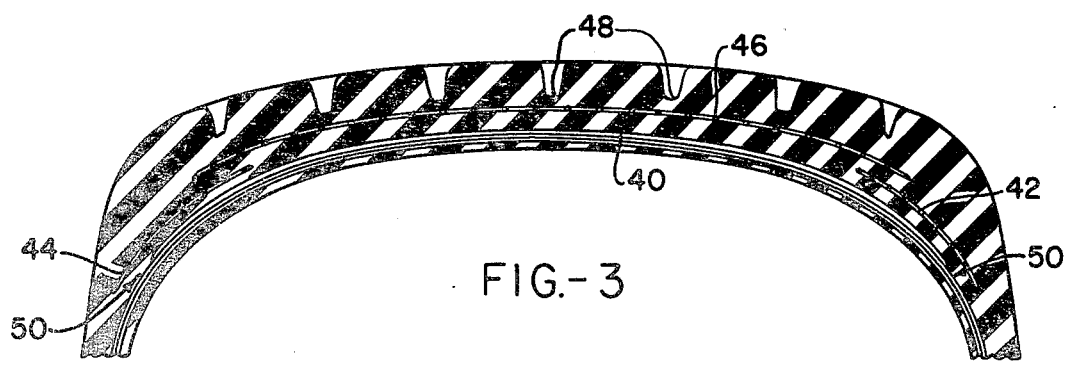
FIG. 3 is a cross-sectional illustration of a tire carcass having a modified strengthening cord arrangement over both the lateral edges of a single belt and between the belt and the tread pattern.
Figure 4:
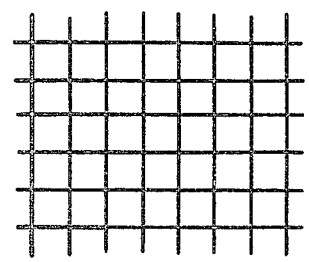
FIG. 4 is a plan view of the strengthening cords showing the make-up as scrim material.

FIG. 3 illustrates a modified embodiment of the invention incorporating only a single standard belt 40 with lateral edge covering belts 42 and 44 and a central belt 46 that is positioned between the belt 40 and the bottom 48 of the tread design. The side belts 42 and 44 prevent the delamination in the areas 48 whereas the belt 46 controls radial force variations by being positioned about midway between the belt 40 and the bottom of the tread design 48 to thereby eliminate tire squirm and increase gas mileage and tire longevity.

The new material which I utilized in the various new belts of my invention illustrated in FIGS. 1 through 3 is preferably in an open weave, space between warp and weft, and preferably bonded or secured at the intersections. The addition of the cord belt material can be to any tire belted or not belted, radial or bias-ply built and, hence, is applicable to new tires as well as retreads. The cords may be run circumferentially or at a bias. The cords in the belts should be of a very strong material such as Kevlar as made by E. I. DuPont, or a similar material, and could be of wire also. Particularly, it is believed that the cord should have at least 125 psi tensile strength, and can vary between 100 to 175 psi tensile strength. The positioning of the new belt between the present belts and the bottom of the tread design helps to true the out-of-round condition in a tire and give greater mileage and gas savings. With respect to the retread, the extra belt can be simply extruded into the retreading material at the source of the supplier of the retread material.

Preferably, the extra belt will be added by a pressure sensitive adhesive holding it in place on the top of the carcass. The tread rubber will be applied prior to vulcanization. The adhesive application will be of vulcanizing adhesives so the cords comprising the belt will be integrally formed as part of the tire and provided in a nonmovable relation to the rubber which surrounds them.

It should be understood that in a great many tires when they are not in motion may appear to be very nearly round. However, when they are in actual operation at 50 or 60 miles per hour, the tire will become elliptical in shape and, even though it is a belted tire, the belt will stretch more in some places than in other places. The addition of my belt between the normal belt and the bottom of the treads will tend to true this elliptical or out-of-round condition since, at speeds of 50 to 60 miles per hour, it stabilizes the tread rubber preventing it from squirming and thereby preventing elongation or growth caused by the force variations within the tire, as the cords in this additional belt will have a tendency to squeeze the material to prevent such separation or squirming movement. Any movement of the tread rubber, either lateral or longitudinal, has a tendency to widen or lengthen the open spaces of the scrim. Therefore, this restriction caused by the scrim being vulcanized to the rubber greatly reduces the cause of separation.

Preferably, the material with the cords comprising the belts will have an open weave of about ¼ inch spacing between the warp and the weft, and preferably will have material of equal strength in both the warp and weft directions. As indicated above, this can be the Kevlar material by E. I. DuPont, or a similar material, or wire.

While in accordance with the patent statutes only the best known embodiments of my invention have been illustrated and described in detail, it is to be particularly understood that my invention is not limited thereto or thereby, but that the inventive scope is defined in the appended claims.

What is claimed is:

1. A pneumatic tire having a tread, a carcass, sidewalls, and a strip of scrim material positioned between the base of the tread and carcass over the full circumference thereof and across a substantial width of the tread which is characterized by the scrim material, including perpendicularly related warp and weft cords with respective cords extending in straight parallel relationship to each other in an open weave spaced between warp and weft to form a belt around the full circumference of the tire, said cords having great tensile strength and being subject to minimum elongation within their designed tensile strength, said cords acting to reduce radial force variations and reduce squirm and friction between tread and carcass in the tire under operating conditions, wherein the warp cords have a tensile strength of between about 100 to about 175 psi, and wherein the warp cords and weft cords have interlocked intersections, said weft cords locking the warp cords into position between the depth of the tread design and the outside of the carcass, and being vulcanized into bonded relation with the tread and the carcass.

2. A pneumatic tire according to claim 1, which includes at least one bias belt between the tire carcass and the tread which is further characterized by the cords being of woven metal strands, natural or synthetic fibers, and the scrim material being between the belt and the tread and extending laterally past the lateral edges of the belt towards the sidewalls to prevent delamination at the lateral edges of the bias belt, said scrim material being bonded to the tread effecting stabilization thereof to prevent tread squirm and heat build up during operational use of the tire.

3. A pneumatic tire according to claim 1 wherein the warp cords extend substantially longitudinally.

4. A pneumatic tire having a tread, a carcass, sidewalls, and at least one bias belt between the tire carcass and the tread, and two sections of scrim material positioned between the base of the tread and the bias belt with a section covering each lateral edge of the bias belt to prevent delamination of the lateral edges of the bias belt which is characterized by the scrim material including perpendicularly related warp and weft cords with respective cords extending in straight parallel relationship to each other in an open weave spaced between warp and weft to form a belt around the full circumference of the tire, said cords having great tensile strength and being subject to minimum elongation within their designed tensile strength, said cords acting to reduce radial force variations and reduce squirm and friction between tread and carcass in the tire under operating conditions, wherein the warp cords have a tensile strength of between about 100 to about 175 psi, and wherein the warp cords and weft cords have interlocked intersections, said weft cords locking the warp cords into position between the depth of the tread design and the outside of the carcass, and being vulcanized into bonded relation with the tread and the carcass.

5. A pneumatic tire according to claim 4, wherein the scrim material is made from a high strength material with the warp and weft cords of about equal strength of between about 100 to 175 psi.

6. A pneumatic tire according to claim 5, wherein the cords are spaced about ¼ inch apart and interlocked at their intersections.

7. A pneumatic tire according to claim 6, wherein the scrim material is extruded into the tread and is compatible with the tread material so as to be fully bonded thereto upon completion of vulcanization of the tire.

8. A pneumatic tire according to claim 4, which includes an additional section of scrim material positioned between the base of the tread and the bias belt and extending between both sections covering the lateral edges over the full circumference thereof.

9. A pneumatic tire according to claim 4 wherein the warp cords extend substantially longitudinally.

* * * * *